United States Patent
Sinha et al.

(10) Patent No.: US 9,113,108 B2
(45) Date of Patent: Aug. 18, 2015

(54) SYSTEMS AND METHODS FOR NAVIGATING PROGRAM LISTINGS SIMULTANEOUSLY DISPLAYED WITH A PROGRAM IN A MEDIA GUIDANCE APPLICATION

(75) Inventors: Gaurav Sinha, Long Beach, CA (US); China Arai, Valley Glen, CA (US); Jason Conness, Los Angeles, CA (US); Brian Peterson, Barrington, IL (US)

(73) Assignee: Rovi Guides, Inc., Santa Clara, CA (US)

( * ) Notice: Subject to any disclaimer, the term of this patent is extended or adjusted under 35 U.S.C. 154(b) by 226 days.

(21) Appl. No.: 12/773,205

(22) Filed: May 4, 2010

(65) Prior Publication Data

US 2011/0154403 A1 Jun. 23, 2011

Related U.S. Application Data

(60) Provisional application No. 61/288,123, filed on Dec. 18, 2009.

(51) Int. Cl.
*H04N 5/445* (2011.01)
*H04N 7/16* (2011.01)
*H04N 21/236* (2011.01)
*H04H 20/28* (2008.01)
(Continued)

(52) U.S. Cl.
CPC ........... *H04N 5/44543* (2013.01); *H04H 20/28* (2013.01); *H04N 5/782* (2013.01); *H04N 21/23614* (2013.01); *H04N 21/4312* (2013.01); *H04N 21/4314* (2013.01); *H04N 21/4334* (2013.01); *H04N 21/47214* (2013.01); *H04N 21/482* (2013.01); *H04N 21/4821* (2013.01); *H04N 2005/44547* (2013.01); *H04N 2005/44556* (2013.01)

(58) Field of Classification Search
CPC .................. H04N 21/23614; H04H 20/28
USPC ....................................... 725/52, 60
See application file for complete search history.

(56) References Cited

U.S. PATENT DOCUMENTS 4,706,121 A 11/1987 Young
5,157,768 A 10/1992 Hoeber et al.
(Continued)

FOREIGN PATENT DOCUMENTS

EP 0693854 A2 1/1996
EP 0735749 A2 10/1996
(Continued)

OTHER PUBLICATIONS

Non-Final Office Action for Application No. 13/027,677 dated Mar. 21, 2012.

*Primary Examiner* — Pankaj Kumar
*Assistant Examiner* — Franklin Andramuno
(74) *Attorney, Agent, or Firm* — Ropes & Gray LLP

(57) ABSTRACT

Systems and methods for navigating program listings in a media guidance application are provided. A program listing may be displayed that corresponds to a first time period. A user request to change the first time period may be received. In response to the request to change the time period, a hopscotch display may be provided that gives the user access to a plurality of consecutive time periods from which the user can select to have corresponding program listings displayed. A user selection of one of the displayed time periods may be received and a second program listing corresponding to the selected time period may be displayed.

18 Claims, 11 Drawing Sheets

(51) Int. Cl.
*H04N 5/782* (2006.01)
*H04N 21/431* (2011.01)
*H04N 21/433* (2011.01)
*H04N 21/472* (2011.01)
*H04N 21/482* (2011.01)

(56) References Cited

U.S. PATENT DOCUMENTS

| | | | |
|---|---|---|---|
| 5,297,249 A | 3/1994 | Bernstein et al. | |
| 5,353,121 A | 10/1994 | Young et al. | |
| 5,410,344 A | 4/1995 | Graves et al. | |
| 5,436,676 A | 7/1995 | Pint et al. | |
| 5,479,266 A | 12/1995 | Young et al. | |
| 5,479,268 A | 12/1995 | Young et al. | |
| 5,532,753 A | 7/1996 | Buchner et al. | |
| 5,532,754 A | 7/1996 | Young et al. | |
| 5,552,833 A | 9/1996 | Henmi et al. | |
| 5,559,549 A | 9/1996 | Hendricks et al. | |
| 5,559,550 A | 9/1996 | Mankovitz | |
| 5,585,838 A | 12/1996 | Lawler et al. | |
| 5,585,866 A | 12/1996 | Miller et al. | |
| 5,589,892 A | 12/1996 | Knee et al. | |
| 5,594,509 A * | 1/1997 | Florin et al. | 725/43 |
| 5,596,373 A | 1/1997 | White et al. | |
| 5,604,544 A | 2/1997 | Bertram | |
| 5,617,526 A | 4/1997 | Oran et al. | |
| 5,619,274 A | 4/1997 | Roop et al. | |
| 5,619,684 A | 4/1997 | Goodwin et al. | |
| 5,621,456 A | 4/1997 | Florin et al. | |
| 5,621,579 A | 4/1997 | Yuen | |
| 5,629,733 A | 5/1997 | Youman et al. | |
| 5,635,989 A | 6/1997 | Rothmuller | |
| 5,675,733 A | 10/1997 | Williams | |
| 5,684,525 A | 11/1997 | Klosterman | |
| 5,781,246 A | 7/1998 | Alten et al. | |
| 5,808,608 A | 9/1998 | Young et al. | |
| 5,822,123 A | 10/1998 | Davis et al. | |
| 5,844,620 A | 12/1998 | Coleman et al. | |
| 5,850,218 A | 12/1998 | LaJoie et al. | |
| 5,870,768 A | 2/1999 | Hekmatpour | |
| 5,880,768 A * | 3/1999 | Lemmons et al. | 725/41 |
| 5,982,445 A | 11/1999 | Eyer et al. | |
| 6,002,394 A | 12/1999 | Schein et al. | |
| 6,037,933 A * | 3/2000 | Blonstein et al. | 715/721 |
| 6,075,575 A | 6/2000 | Schein et al. | |
| 6,078,348 A | 6/2000 | Klosterman et al. | |
| 6,088,708 A | 7/2000 | Burch et al. | |
| 6,118,492 A | 9/2000 | Milnes et al. | |
| 6,151,059 A | 11/2000 | Schein et al. | |
| 6,172,677 B1 | 1/2001 | Stautner et al. | |
| 6,177,931 B1 | 1/2001 | Alexander et al. | |
| 6,239,794 B1 | 5/2001 | Yuen et al. | |
| 6,388,714 B1 | 5/2002 | Schein et al. | |
| 6,426,779 B1 | 7/2002 | Noguchi et al. | |
| 6,499,138 B1 | 12/2002 | Swix et al. | |
| 6,532,589 B1 | 3/2003 | Proehl et al. | |
| 6,564,378 B1 | 5/2003 | Satterfield et al. | |
| 6,571,390 B1 | 5/2003 | Dunn et al. | |
| 6,681,396 B1 * | 1/2004 | Bates et al. | 725/58 |
| 6,732,369 B1 | 5/2004 | Schein et al. | |
| 6,756,997 B1 * | 6/2004 | Ward et al. | 715/716 |
| 6,966,037 B2 | 11/2005 | Fredriksson et al. | |
| 7,062,777 B2 | 6/2006 | Alba et al. | |
| 7,165,098 B1 | 1/2007 | Boyer et al. | |
| 7,380,216 B2 | 5/2008 | Feig et al. | |
| 7,502,590 B2 | 3/2009 | Suzu | |
| 7,681,149 B2 | 3/2010 | Lähdesmäki | |
| 8,578,414 B2 | 11/2013 | Alba et al. | |
| 8,683,539 B1 | 3/2014 | Harvey et al. | |
| 8,925,018 B2 | 12/2014 | Alba et al. | |
| 2002/0010926 A1 | 1/2002 | Lee | |
| 2002/0174430 A1 | 11/2002 | Ellis et al. | |
| 2002/0184627 A1 | 12/2002 | Alba et al. | |
| 2003/0046698 A1 * | 3/2003 | Kamen et al. | 725/53 |
| 2003/0066085 A1 * | 4/2003 | Boyer et al. | 725/104 |
| 2003/0110499 A1 | 6/2003 | Knudson et al. | |
| 2004/0233238 A1 | 11/2004 | Lahdesmaki | |
| 2005/0028208 A1 | 2/2005 | Ellis et al. | |
| 2005/0251827 A1 | 11/2005 | Ellis et al. | |
| 2006/0116094 A1 * | 6/2006 | Suzu | 455/154.1 |
| 2006/0117007 A1 * | 6/2006 | Tsujimura et al. | 707/6 |
| 2006/0242666 A1 | 10/2006 | Alba et al. | |
| 2006/0262218 A1 * | 11/2006 | Querre | 348/468 |
| 2007/0006273 A1 * | 1/2007 | Rodriguez et al. | 725/100 |
| 2008/0126989 A1 | 5/2008 | Flores et al. | |
| 2008/0184295 A1 | 7/2008 | Alba et al. | |
| 2008/0184311 A1 | 7/2008 | Boyer et al. | |
| 2008/0271078 A1 * | 10/2008 | Gossweiler et al. | 725/40 |
| 2009/0178080 A1 | 7/2009 | Imai | |
| 2010/0186037 A1 | 7/2010 | Alba et al. | |
| 2010/0192181 A1 | 7/2010 | Friedman | |
| 2011/0154402 A1 | 6/2011 | Sinha et al. | |
| 2011/0314499 A1 | 12/2011 | Alba et al. | |
| 2012/0185901 A1 | 7/2012 | Macrae et al. | |

FOREIGN PATENT DOCUMENTS

| | | |
|---|---|---|
| GB | 2126002 A | 3/1984 |
| JP | 2007-036343 | 8/2007 |
| JP | 2006-217432 | 8/2008 |
| WO | WO 93/22877 | 11/1993 |
| WO | WO 94/13107 | 6/1994 |
| WO | WO 95/01057 | 1/1995 |

* cited by examiner

SYSTEMS AND METHODS FOR NAVIGATING PROGRAM LISTINGS SIMULTANEOUSLY DISPLAYED WITH A PROGRAM IN A MEDIA GUIDANCE APPLICATION

CROSS-REFERENCE TO RELATED APPLICATION

This application claims the benefit under 35 U.S.C. §119 (e) of U.S. Provisional Application No. 61/288,123, filed Dec. 18, 2009 which is hereby incorporated by reference herein in its entirety.

BACKGROUND OF THE INVENTION

Typical systems display program listings for a particular time interval. In order for a user to access previous or future program listings, the user must repeatedly scroll through the program listings for adjacent time intervals until the program listings for the desired time interval are displayed. Thus, navigating to program listings that are hours or days away from the currently displayed time interval is a tedious process.

Blonstein et al. U.S. Pat. No. 6,037,933 discusses one solution to this problem by providing a "more times" display allowing the user to select a particular time instance in the future for which to display program listings. However, the "more times" display in the Blonstein system provides the user with a particular set of preselected times from which the user can choose and therefore limits the user's ability to view program listings for any given time period.

SUMMARY OF THE INVENTION

In view of the foregoing, systems and methods for navigating program listings in a media guidance application are provided. In particular, a hopscotch display is provided that displays a plurality of indicators that represent time periods that the user can select to have corresponding program listings displayed.

In some embodiments, a user request to display a plurality of program listings corresponding to a user selected time period is received. In particular, a user may select a hopscotch icon from a program listings display to instruct control circuitry to change the time period that is displayed. The control circuitry may in response to receiving the request, provide a hopscotch display that includes a first plurality of indicators that represent a first plurality of time periods (e.g., days of the week) and a second plurality of indicators that represent a second plurality of time periods (e.g., hours within a given day). The second plurality of time periods are subsets of the first plurality of time periods. The hopscotch display allows the user to navigate to and select any time period for which to display program listings. In some implementations, the second plurality of time indicators are displayed as the user navigates from one of the first plurality of time periods to another.

In some implementations, only one instance of the second plurality of indicators is displayed at a time. In particular, only the second plurality of indicators that correspond to one of the first plurality of indicators may be displayed at a time. More specifically, when a first of the first plurality of indicators is selected (e.g., Monday), only the second plurality of indicators (e.g., subsets of hours within the day Monday) for the selected first of the first plurality of indicators may be displayed. That is, the second plurality of indicators are not displayed for any of the first plurality of indicators that are not selected at given time.

In some embodiments, the control circuitry may monitor the user input and automatically provide the hopscotch display. In particular, the control circuitry may determine whether a plurality of identical user inputs have been received a predetermined number of times. The identical user inputs may correspond to identical instructions to shift or slide the display to display a plurality of program listings for another time period adjacent to the displayed time period. After a predetermined number of times of being instructed to shift or slide the display to an adjacent time period, the control circuitry may automatically provide the hopscotch display to allow the user to select any time period in the future or past.

In some embodiments, the first and second plurality of indicators in the hopscotch display may include cells. The cells of the first plurality of indicators may correspond to days of the week and the cells of the second plurality of indicators may correspond to hours within a particular day of the week. A user selection of one of the displayed time periods may be received. The control circuitry may display a plurality of program listings corresponding to the time period selected by the user from the hopscotch display.

In some embodiments, as the user navigates between cells in hopscotch that represent different days of the week, the control circuitry may display actions or event that have been scheduled for the particular day. In particular, as the user navigates a cursor from a cell representing the day, Tuesday, to the cell representing the day, Monday, the control circuitry may retrieve and display indicators that identify to the user the reminders or recordings previously scheduled for the day represented by the highlighted cell, Monday. In some implementations, the user may select the indicators identifying particular scheduled actions or events to allow the user to modify the scheduled action or event.

In some embodiments, a video of a program may be displayed simultaneously with a first program listing corresponding to a first time period. The program listing may be overlaid on top of the video and may be partially transparent to allow the user to see the video simultaneously with the program listing. A user request to display a second program listing corresponding to a second time period may be received. In response to receiving the user request, a hopscotch display that includes plurality of alternate time periods may be displayed. In some implementations, the hopscotch display is displayed simultaneously with the program listing and the video of the program. The hopscotch display may be partially transparent to allow the user to see the video of the program simultaneously with the hopscotch display.

In some embodiments, the control circuitry may monitor the user input as the user navigates through the program listings displayed with the video of the program and automatically provide the hopscotch display. In particular, the control circuitry may determine whether a plurality of identical user inputs have been received a predetermined number of times. The identical user inputs may correspond to identical instructions to shift or slide the display to display program listings for adjacent time periods. After a predetermined number of times of being instructed to shift or slide the display to an adjacent time period, the control circuitry may automatically display the hopscotch display simultaneously with the program listing and the video of the program to allow the user to select any time period in the future or past.

In some embodiments, the hopscotch display may replace the program listing being displayed with the video of the program. A user selection of one of the displayed alternate time periods in the hopscotch display is received. The second program listing corresponding to the selected one of the alternate time periods is displayed simultaneously with the video of the program.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1A:
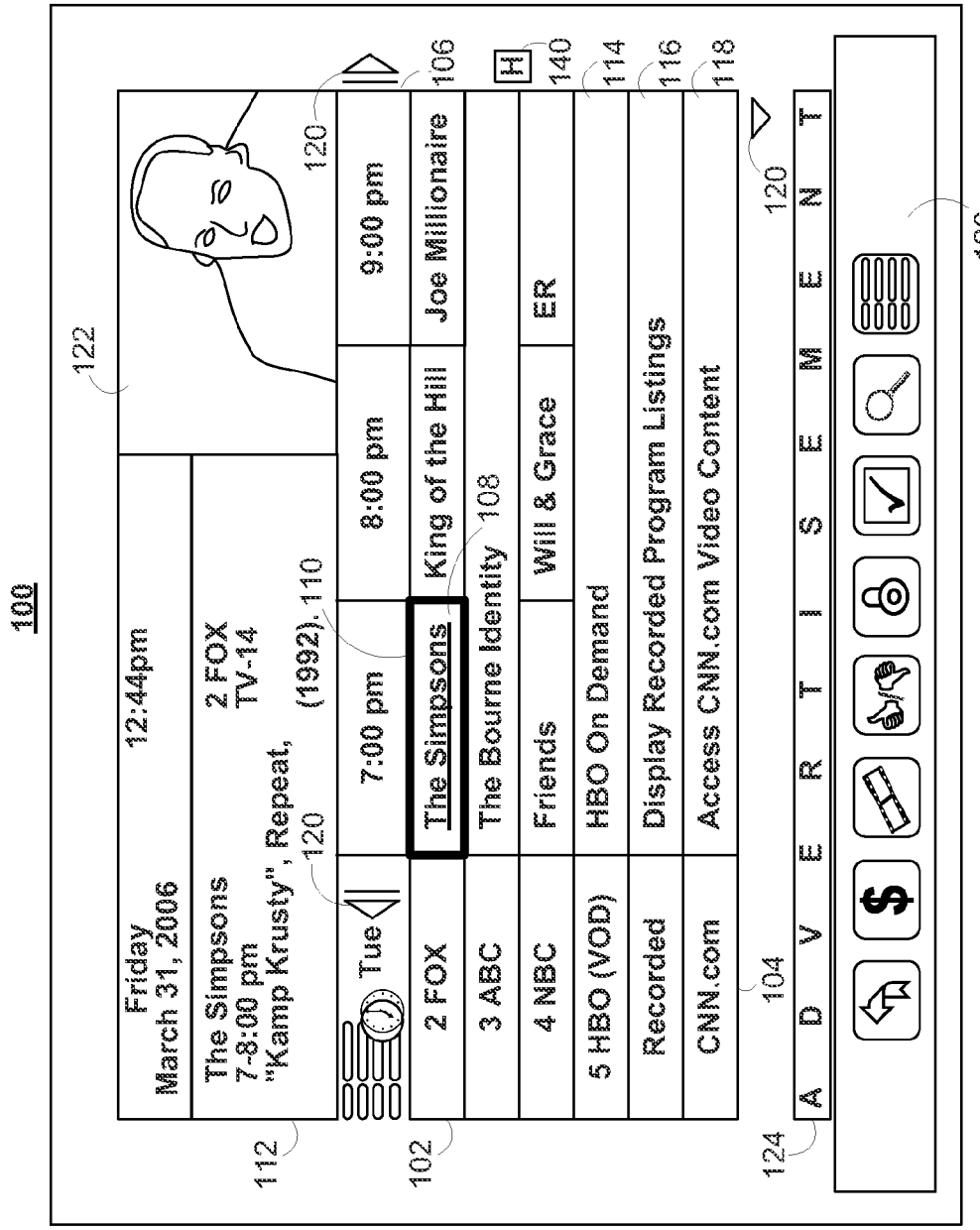
FIGS. 1a-b and 2 show illustrative display screens that may be used to provide media guidance application listings in accordance with an embodiment of the invention.

This invention generally relates to systems and methods for navigating program listings in a media guidance application. In particular, systems and methods are provided for allowing a user to select any future or past time period for which to display program listings.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as online applications (i.e., provided on a web-site), or as stand-alone applications or clients on hand-held computers, PDAs, mobile telephones, or other mobile devices. The various devices and platforms that may implement media guidance applications are described in more detail below.

Figure 1B:
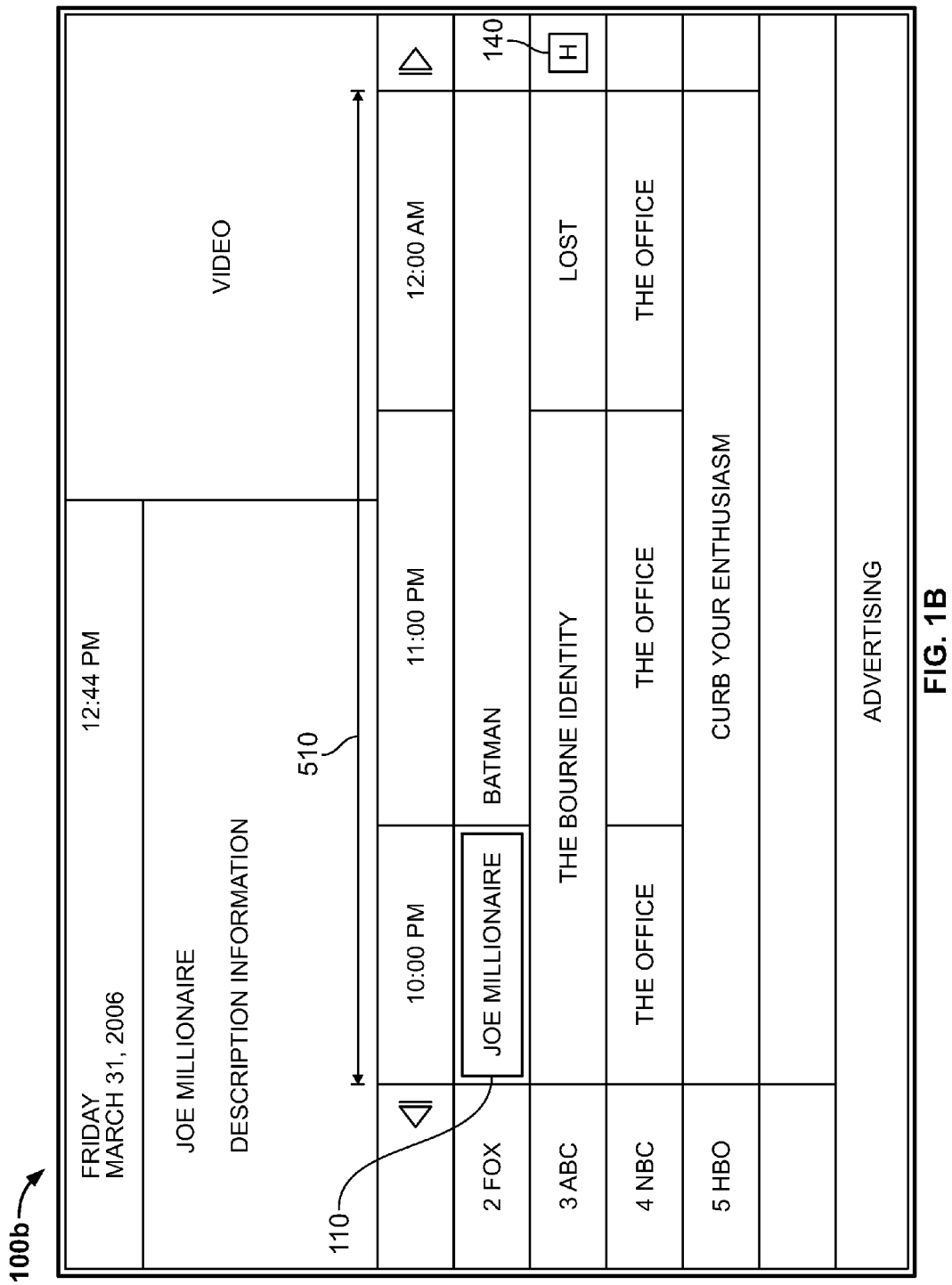
Figure 2:
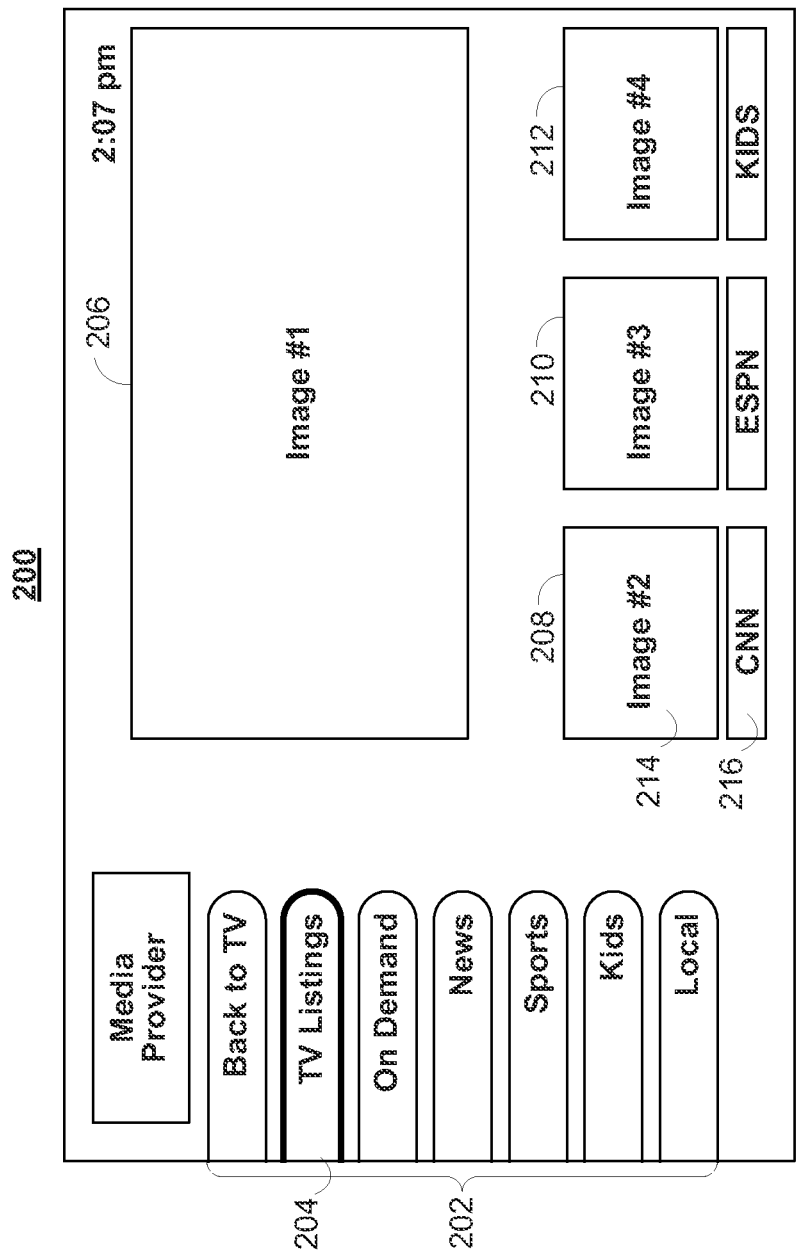

One of the functions of the media guidance application is to provide media listings and media information to users. FIGS. 1-2 show illustrative display screens that may be used to provide media guidance, and in particular media listings. The display screens shown in FIGS. 1-2 and 5-9 may be implemented on any suitable device or platform. While the displays of FIGS. 1a-b-2 and 5-9 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1a shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. The length of time indicated by the combination of time identifiers 106 is referred to as a time period. Grid 102 also includes cells of program listings, such as program listing 108, where each listing provides the title of the program provided on the listing's associated channel and time. In some embodiments, the time period displayed in grid 102 covers a three hour time interval. In particular, the first set of program listings 108 displayed in grid 102 correspond to a three hour time period or window of time. Any other time period (or time interval) may be displayed in grid 102 limited only by the physical constraints of the device used to display the program listings. For example, when using a handheld device, a smaller time period (e.g., one hour) may be more suitable as the font size must be made to fit within the physical constraints of the display of the handheld device. Accordingly, when using a handheld device, grid 102 may display program listings 108 for one hour time periods.

With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block or time period displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

For example, the user may select right icon 120 or press the right arrow key on the user input device to cause the media guidance application to display a time period adjacent to the displayed time period. In particular, the user may navigate cursor 110 to the last listing displayed in grid 102 (e.g., Joe Millionaire). When cursor 110 is positioned over the last listing displayed in grid 102 and the user presses the right arrow key on the user input device, the media guidance application may slide into the display a second set of program listings corresponding to a time period adjacent to the displayed time period. More specifically, the media guidance application, upon receiving the user input of the right arrow key, may retrieve and display program listings for the time period 10:00 PM-12:00 AM (e.g., the next adjacent time period to the time period 7-9 PM currently displayed) as shown in FIG. 1b. In particular, display 100b in FIG. 1b shows cursor 110 positioned over the first program listing (e.g., Joe Millionaire) corresponding time indicator 10:00 PM. Display 100b shows program listings corresponding to a second time period 510 which spans the time interval 10:00 PM-12:00 AM.

In some implementations, the media guidance application may retrieve and display the program listings corresponding to the next adjacent time indicator 106 instead of the program listings corresponding to the entire time period. In such circumstances, the earliest displayed time indicator 106 (e.g., 7:00 PM) is shifted out of the display and the next adjacent time indicator 106 (e.g., 10:00 PM) is shifted into the display with the corresponding program listings for that time (e.g., 10:00 PM).

Figure 6:
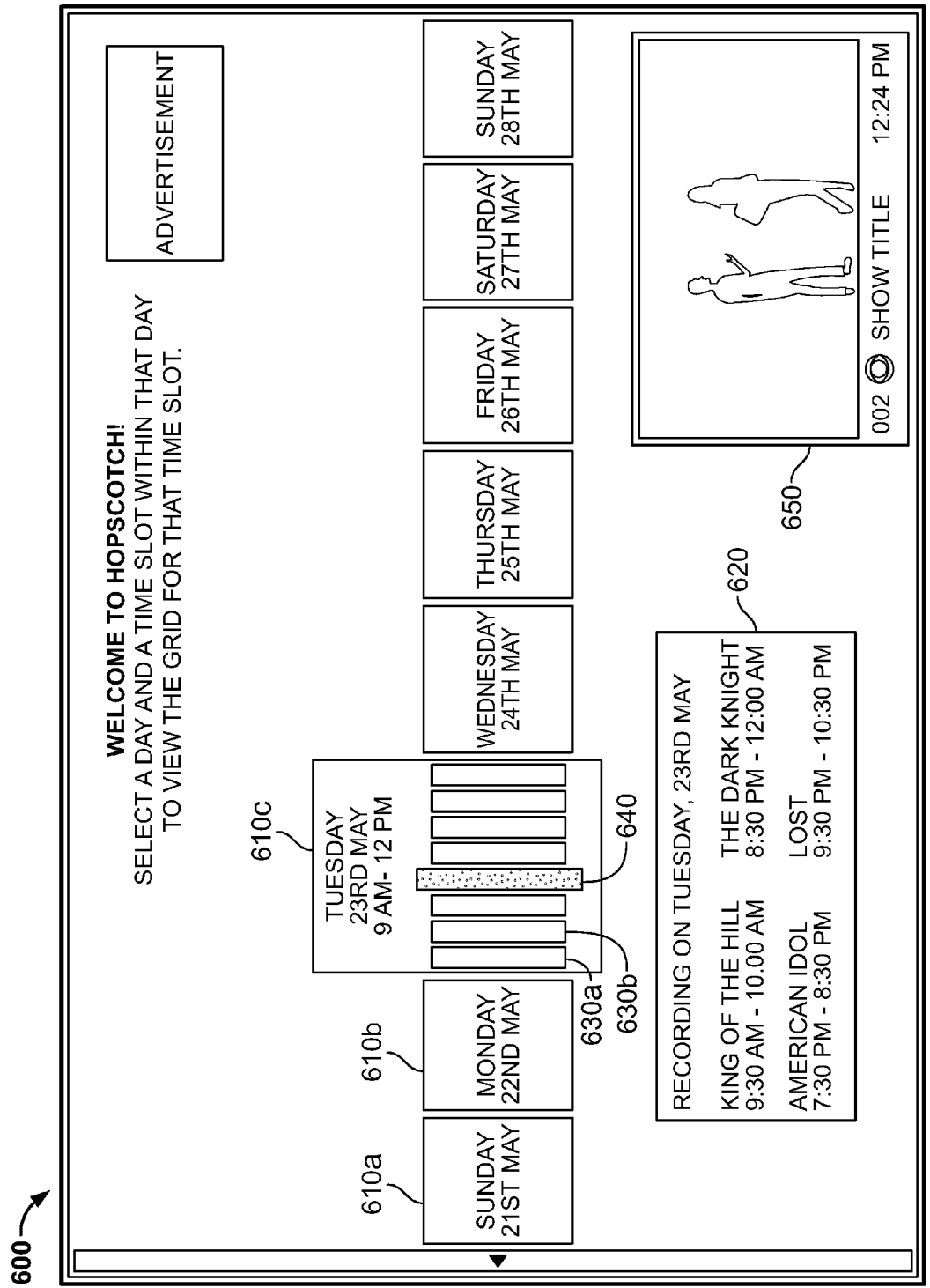
FIG. 6 shows an illustrative hopscotch display in accordance with an embodiment of the invention.
Figure 7:
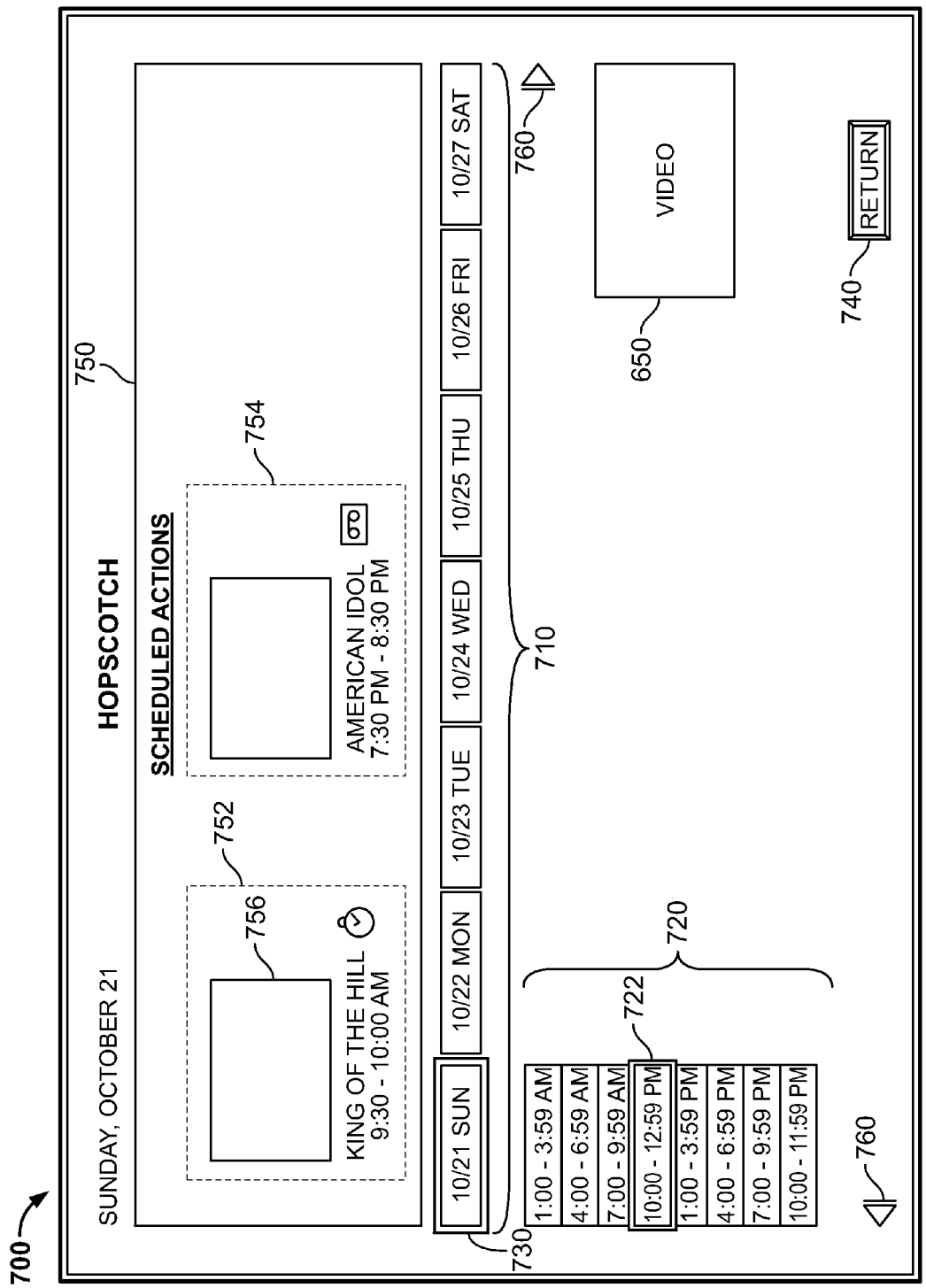
FIGS. 7 and 8 show an illustrative hopscotch display in accordance with an embodiment of the invention.
Figure 8:
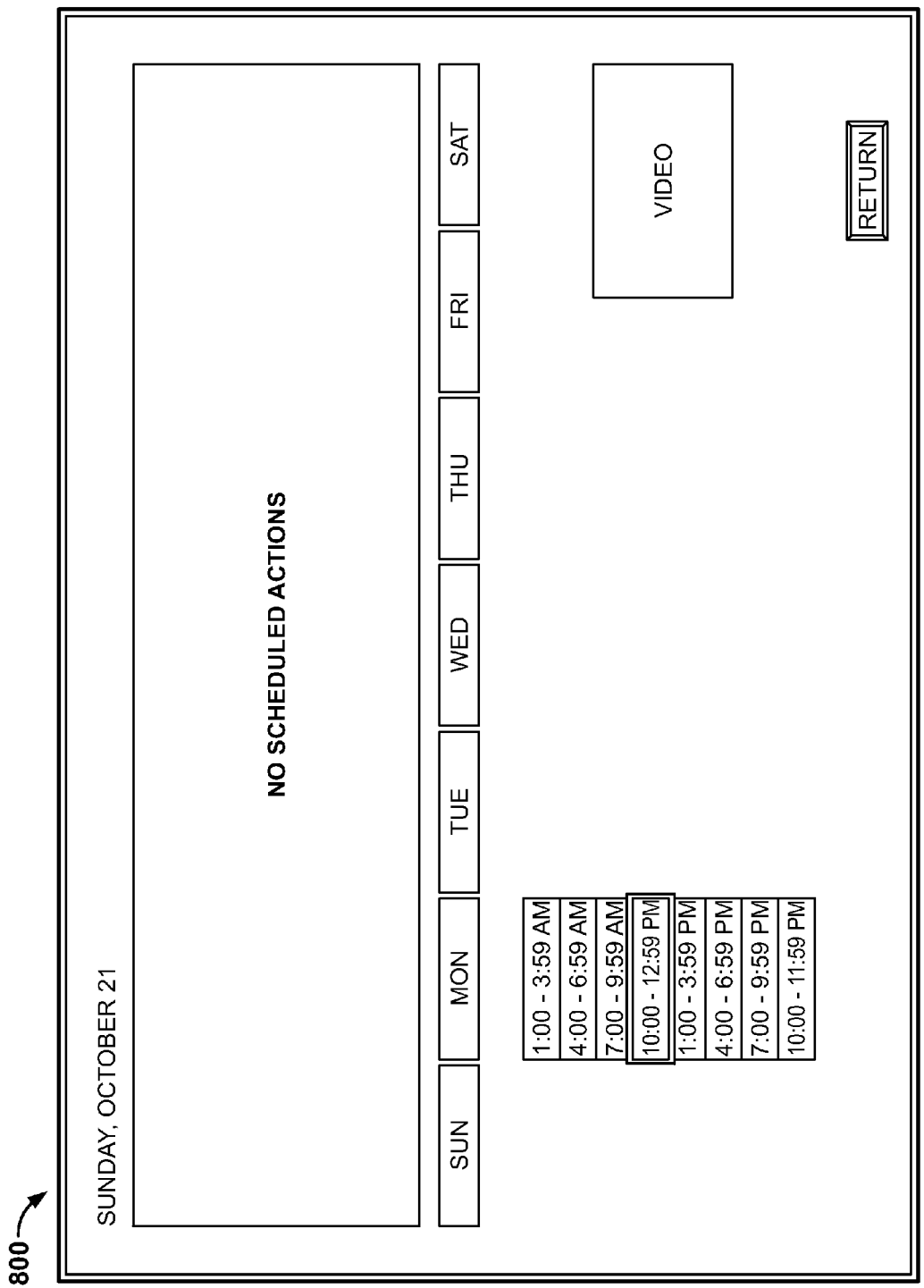

In some embodiments, display 100 includes a hopscotch option 140. Selection of hopscotch option 140 may cause the media guidance application to slide into the display a hopscotch display 600 or 700 (FIG. 6 or 7). Hopscotch displays 600 and 700 allow the user to select any past or future time period to cause the media guidance application to display program listings in grid 102 corresponding to the selected time period. Hopscotch displays 600 and 700 and their associated functionality are discussed in more detail below in connection with FIGS. 6-9.

In some embodiments, hopscotch option 140 may be selected by the user by pressing a dedicated button on user input device. In some embodiments, hopscotch option 140 may be selected by navigating cursor 110 to the listing displayed at an outer edge of grid 102 (e.g., the right edge) and pressing a right arrow key on the user input device. Cursor 110 may be positioned over hopscotch option 140 and may cause hopscotch display 600 or 700 to be provided when the user presses a SELECT key on the user input device. When cursor 110 is positioned over hopscotch option 140 and the user presses a directional arrow key (e.g., right arrow key when the hopscotch option 140 is provided on the right edge of grid 102) on the user input device, the media guidance application may display the program listings for the next adjacent time period (e.g., the program listings for the time period 10-12 AM or the program listings for the next time indicator 10 PM).

In some embodiments, after the user presses the right arrow key on the user input device (e.g., after control circuitry receives an identical user input) a predetermined number of times (e.g., 3 times), the media guidance application may automatically slide into the display hopscotch display 600 or 700. In particular, the media guidance application may predict based on the user's behavior and interactions that the user desires to access or view program listings for programs broadcast hours or days in the future. Accordingly, to reduce the burden on the user of pressing the right arrow key using the user input device until the desired program listings are displayed, the media guidance application automatically (i.e., without further user input) provides hopscotch display 600 or 700 to allow the user to quickly and easily jump to the desired time period.

It should be understood that the identical user input may be received consecutively or may be interspersed between other user inputs. More specifically, the identical user inputs that are received a predetermined number of times correspond to identical instructions that are received a predetermined number of times. For example, the user may navigate a program guide and transmit an instruction to the control circuitry to shift or slide into the display program listings for an adjacent (previous or future) second time period. After the program listings for the adjacent time period are displayed, the user may navigate among those program listings by transmitting instructions to move cursor 110 up/down/left/right within the displayed program listings. The user may then issue another instruction to display another set of program listings for a third time period (previous or future) adjacent to the currently displayed time period. This instruction is identical to the instruction previously transmitted to the control circuitry for displaying the program listings for the second time period. Accordingly, when the predetermined number of times is twice, the control circuitry may automatically, upon receiving the user instruction to display the program listings for the third time period, provide the hopscotch display. This is the case even though the user provided other instructions between the identical instructions to display program listings for an adjacent time period.

For example, the user may be viewing the program listings for a first time period 7-9 PM and may press the right arrow icon 120 or the right arrow key on the user input device to cause the media guidance application to slide into the display the program listings for a second time period (e.g., 10 PM-12 AM). After the control circuitry receives the user input and instructs the media guidance application to slide into the display the program listings for the second time period, the user may select the right arrow icon 120 or press the right arrow key on the user input device again to cause the media guidance application to slide into the display the program listings for a third time period (e.g., 1 AM-3 AM). When the user now selects the right arrow icon 120 or presses the right arrow key on the user input device again to cause the media guidance application to slide into the display program listings for a fourth time period (e.g., 4 AM-6 AM), the media guidance application may automatically slide or bring into the display hopscotch display 600 or 700 (FIG. 6 or 7) instead of displaying the desired program listings for the fourth time period.

In some implementations, the media guidance application may provide a prompt (not shown) to the user asking whether the user would like to access hopscotch display 600 or 700 before displaying the desired program listings for the fourth time period. When the user confirms the desire to access the hopscotch display, the media guidance application may slide or bring into the display hopscotch display 600 or 700 otherwise the media guidance application may display the program listings for the fourth time period. The above example illustrated the situation where the media guidance application automatically provided the hopscotch display 600 or 700 after the user instructed the media guidance application to display program listings for future time periods twice (by selecting the right arrow options or keys). However, it should be understood that the media guidance application may be configured to provide such automatic functionality of providing the hopscotch display 600 or 700 after receiving any number of predetermined user selections or inputs instructing the media guidance application to display program listings for future time periods.

It should also be understood that the above illustration applies in a similar manner to the situation where the user selects the left arrow 120 or presses the left arrow key on the user input device (e.g., to view program listings for time periods previous to the program listings in the display). For example, the user may select left arrow option 120 or press the left arrow key on the user input device a predetermined number of times (e.g., 3 times) and instead of displaying program listings for the previous time period, the media guidance application may slide or bring into the display hopscotch display 600 or 700 (FIG. 6 or 7).

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
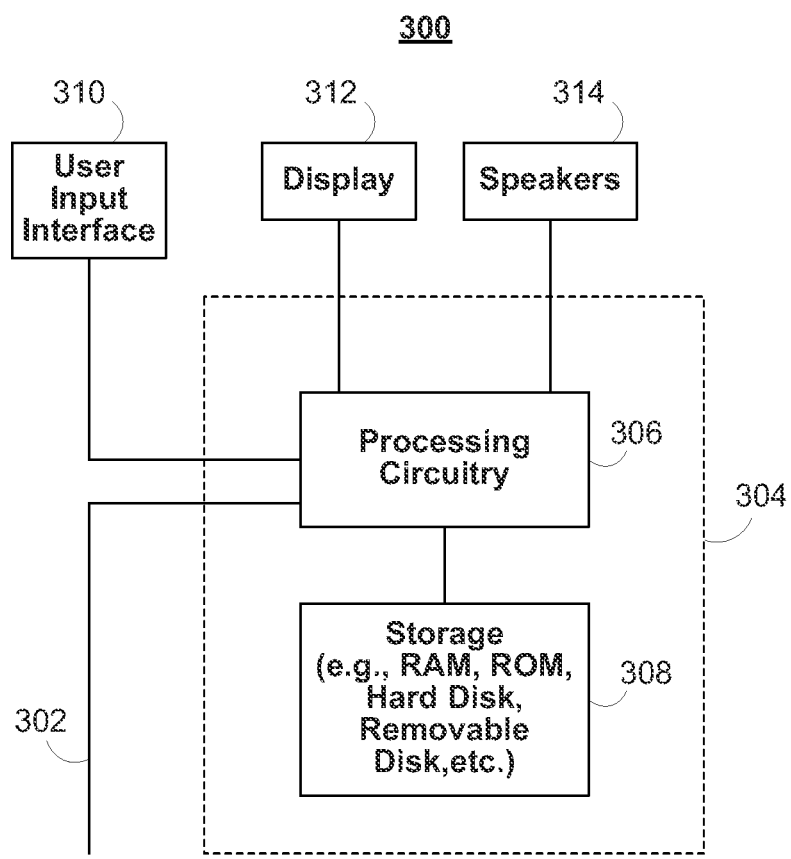
FIG. 3 shows an illustrative user equipment device in accordance with another embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface or device 310. User input interface 310 may be any suitable user interface, such as a remote control, mouse, trackball, keypad, keyboard, touch screen, touch pad, stylus input, joystick, voice recognition interface, or other user input interfaces. For example, when a user presses a button (e.g., SELECT or right arrow or left arrow directional keys) on the user input device 310, a communication or message with the corresponding command (e.g., select or move right) is transmitted from the user input device 310 for receipt and processing by control circuitry 304. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
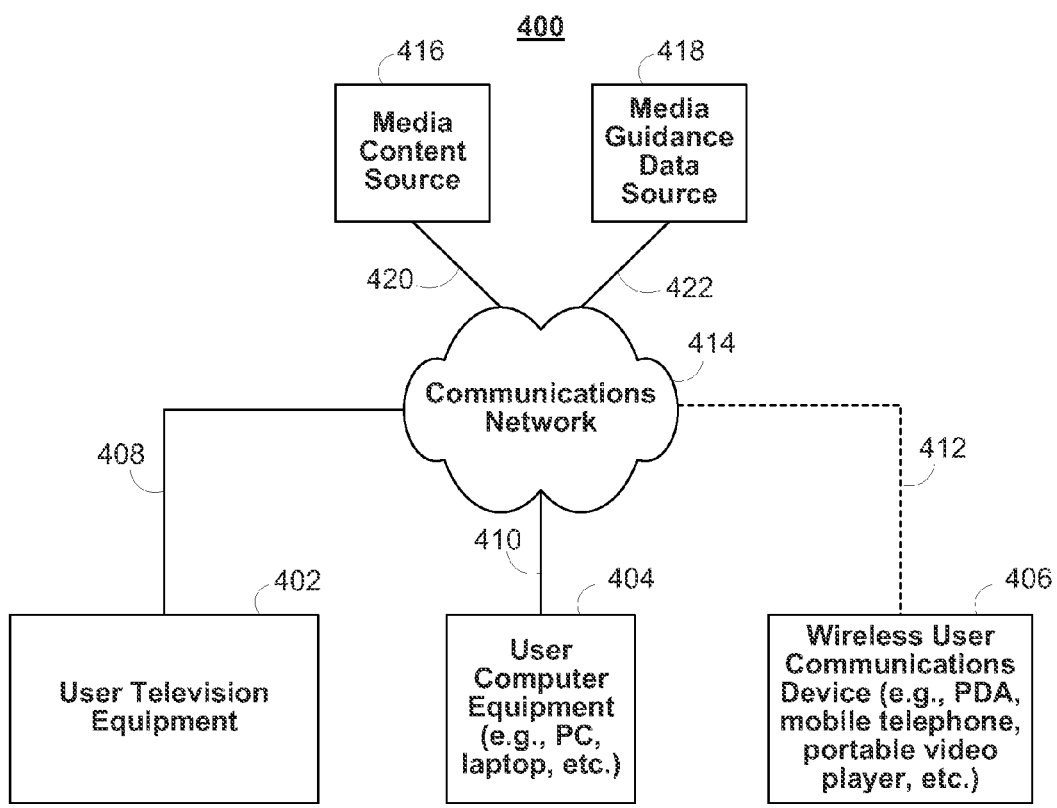
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, standalone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments, control circuitry 304 may display a program listing simultaneously with a program or video of the program being watched. In particular, control circuitry 304 may allow the user to browse program listings for other program while watching the program on the display. Control circuitry 304 may display the program listing or multiple program listings by providing a display similar to grid 102 discussed in relation to FIGS. 1*a*-*b*. While browsing through the program listings at the same time as watching a program, control circuitry 304 may provide the user with access to a hopscotch display (e.g., display 600 or 700) for faster and easier access to program listings corresponding to different time periods.

Figure 5:
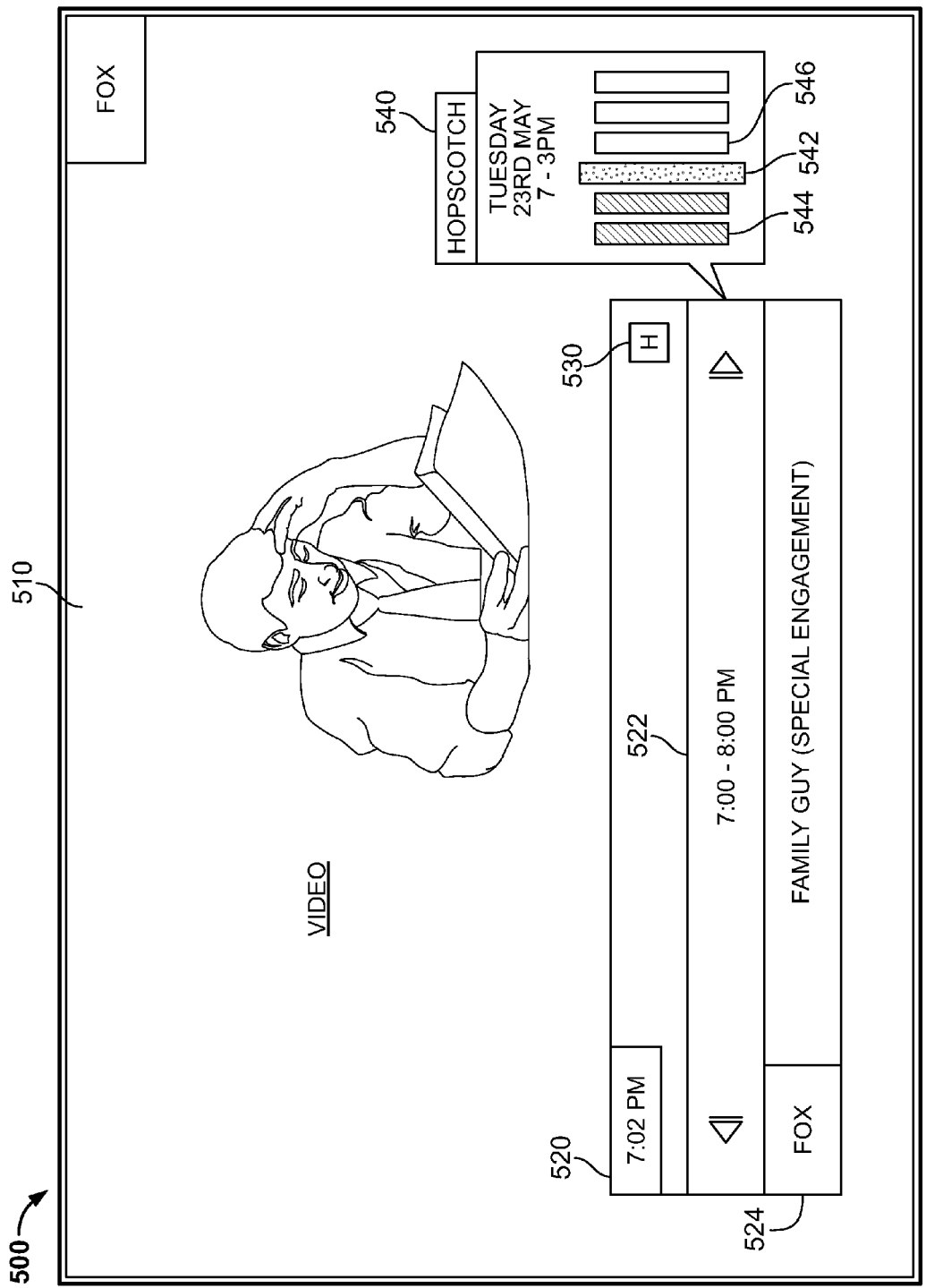
FIG. 5 shows an illustrative display for providing media guidance application listings simultaneously with video of a program in accordance with an embodiment of the invention.

FIG. 5 shows an illustrative display 500 that may be used to provide media guidance application listings simultaneously with video of a program in accordance with an embodiment of the invention. Display 500 includes a video 510, a browse display 520 and a hopscotch display 540. Video 510 may be an image or video of the currently tuned channel or an image or video currently being watched on the main display of a video-on-demand media asset, Internet delivered content (e.g., HULU.com or YOUTUBE.com), website or any other suitable content provided on the main display.

Browse display 520 may be displayed for the user when control circuitry 304 receives an instruction (e.g., display guide instruction) from the user via the user input device. For example, the user may press a GUIDE button on the user input device while watching video 510 and in response control circuitry 304 may provide browse display 520. Browse display 520 may be displayed simultaneously or together with video 510. In some implementations, browse display 520 may be overlaid on top of video 510. Browse display 520 may be partially transparent to allow the user to view both browse display 520 and video 510 through the same portion of the display screen.

Browse display 520 may include the current time, a program listing 524 corresponding to a time period 522 and a hopscotch icon 530. In some embodiments, hopscotch icon 530 may be excluded from browse display 520. For example, hopscotch icon 530 may be excluded when the hopscotch display is provided automatically to the user after receiving a predetermined number of identical instructions (e.g., receiving three presses of the right/left arrow key on the user input device).

In some embodiments, time period 522 may correspond to a time interval length of one hour, 30 minutes or any other suitable time interval. Program listing 524 may include the titles and channels that are provided during time period 522. Program listings for adjacent time periods may be displayed when the user transmits instructions to control circuitry 304 to shift or slide into the display program listings for adjacent time periods (e.g., by selecting an on-screen option (directional arrow) or pressing a right/left arrow key on a user input device). In some embodiments, control circuitry 304 may count the number of times the user issues an identical instruction (e.g., to shift or slide into the display program listings for an adjacent time period). After control circuitry 304 determines the number of time the user issued the identical instructions meets or exceeds a predetermined number (e.g., three identical instructions), control circuitry 304 may automatically display hopscotch display 540. In some embodiments, hopscotch display 540 may be provided when the user selects the on-screen hopscotch icon 530 or presses a dedicated key on the user input device.

Hopscotch display 540 may include a plurality of cells each representing different consecutive time periods. For example, a first cell 544 may represent the time period of 5-6 PM, a second cell 542 may represent a time period 7-8 PM and a third cell 546 may represent a time period 8-9 PM. To represent consecutive time periods there may be no break in the time period that is represented. In particular, if a 6 hour time interval (length of time) is to be presented in hopscotch display 540 and each cell represents a one hour time period, hopscotch display 540 will include 6 different cells. In some implementations, the cells may be arranged in consecutive order such that the cell representing the time period 7-8 PM is adjacent to both the cells representing the time period 6-7 PM and 8-9 PM.

In some embodiments, when hopscotch display 540 is initially provided, the cell representing the current time period is automatically highlighted or selected. For example, the cell representing the current time period may be shaded a different color, may have a different size than the other cells in hopscotch 540 or may be distinguished from the other cells in hopscotch 540 in any other suitable manner. In particular, since the current time in display 510 is shown to be 7:02 PM, cell 542 representing the time period 7-8 PM is initially highlighted by the cursor (illustrated as being sized differently from the other cells in hopscotch display 540).

To navigate and select a cell representing another or an alternate time period, the user may press a directional arrow key on the user input device that corresponds to the direction to which the cursor is to be moved. For example, when the cursor is positioned over cell 542, the user may press a left directional arrow key on the user input device to move the cursor towards the cells on the left of cell 542 and towards cell 544. When control circuitry 304 receives an instruction (e.g., a right arrow key press on the user input device) to move the cursor or highlight region towards the right, the cursor may be moved towards cell 546. In some implementations, the cells may be arranged in a vertical orientation, and accordingly the user may similarly press the up/down directional arrow keys to navigate the cursor to a desired cell representing a particular time period.

Although hopscotch display 540 provides access to time periods within a single day (e.g., Tuesday), time periods corresponding to different days may be accessed or displayed. For example, when the user navigates the cursor to the cell representing the last time period within the displayed day (e.g., Tuesday) and issues an instruction to go to the next time period (e.g., presses the right arrow key on the user input device), control circuitry 304 may display cells representing time periods for the next adjacent day (e.g., Wednesday). Alternatively, when the user navigates the cursor to the cell representing the first time period within the displayed day (e.g., Tuesday) and issues an instruction to go to the previous time period (e.g., presses the left arrow key on the user input device), control circuitry 304 may display cells representing time periods for the previous adjacent day (e.g., Monday).

In some embodiments, cells that represent time periods previous to the current time period may be grayed out or shaded a different color or be visually distinguished from other cells in hopscotch display 540. For example, as shown in display 510, since cells to the left of cell 542 represent time periods previous to the current time period of 7-8 PM they are shown in a different color. In particular, cell 544 is grayed out to visually indicate to the user that cell 544 represents time periods previous to the current time period. In some implementations, cells that represent time periods previous to the current time periods are not selectable such that the user may not be able to navigate to such cells.

In some embodiments, the time periods represented by the cells in hopscotch display 540 are each identical to time period 522 in browse display 520. For example, when time period 522 in browse display 520 represents a one hour time interval, each of the cells in hopscotch display 540 represent a time period with a one hour time interval.

Control circuitry 304 may receive instructions from the user input device to navigate the cursor to a particular cell in hopscotch display 540. The user may issue an instruction to control circuitry 304 to select the cell over which the cursor is positioned by, for example, pressing a SELECT key on the user input device. When control circuitry 304 receives an instruction to select the cell over which the cursor is positioned, control circuitry 304 may retrieve from memory the program listings corresponding to the time period represented by the selected cell. Browse display 520 may provide a single channel guide in which program listings are displayed for a selected channel. Accordingly, control circuitry 304 may retrieve the program listings corresponding to the channel identified in browse display 520 for the time period represented by the selected cell. The program listing(s) may be displayed in browse display 520 and time period 522 may be updated to reflect the time period represented by the selected cell.

It should be understood that although only a single program listing for a single channel is shown in browse display 520, any number of additional program listings for one or more channels may be displayed in browse display 520. For example, control circuitry 304 may display a miniature version of grid 102 discussed in relation with FIG. 1.

In some embodiments, when control processor 304 determines the need (e.g., automatically or in response to a specific user input or selection) to provide a hopscotch display, control processor 304 may provide a hopscotch display that may occupy a portion or the full screen. The user may navigate through the hopscotch display to select an alternate time period for which to display program listings.

FIG. 6 shows an illustrative hopscotch display 600 in accordance with an embodiment of the invention. Display 600 includes a first plurality of cells 610, a second plurality of cells 630, an action or event window 620 and a video window 650. Video window 650 may display the video of the last tuned to channel or program that was being watched. Video window 650 may provide the same or similar functionality and display as video 510 (FIG. 5) and for the sake of brevity and not limitation the discussion will be omitted. In some embodiments, video window 650 may provide a short preview clip corresponding to media asset information displayed in event window 620. In some embodiments, video window 650 may provide a short preview clip corresponding to information provided in an advertisement in display 600.

Each of first plurality of cells 610 may represent consecutive time periods (e.g., days of the week). For example, cell 610a may represent Sunday, cell 610b may represent Monday and cell 610c may represent Tuesday. Any number of cells 610 may be provided where each represents a day of the current week or subsequent or prior weeks. To represent consecutive time periods there may be no break in the time period that is represented. In particular, if a 6 day interval (length of time) is to be presented in hopscotch display 600 and each cell represents a single day of the week, hopscotch display 600 will include 6 different cells. In some implementations, the cells may be arranged in consecutive order such that the cell representing the time period Monday is adjacent to both the cells representing the time period Sunday and Tuesday.

In some embodiments, when hopscotch display 600 is initially provided, the cell representing the current time period is automatically highlighted or selected by a cursor. For example, cell 610c representing the current time period may be shaded a different color, may have a different size than the other cells in hopscotch display 600 or may be distinguished from the other cells in hopscotch display 600 in any other suitable manner. In particular, the current time in display 600 may be 9:02 AM on Tuesday, and accordingly cell 610c representing the time period Tuesday is initially highlighted by the cursor (illustrated as being sized differently from the other cells in hopscotch display 600). To navigate and select a cell representing another time period, the user may press a directional arrow key on the user input device that corresponds to the direction to which the cursor is to be moved. For example, when the cursor is positioned over cell 610c, the user may press a left directional arrow key on the user input device to move the cursor towards the cells on the left of cell 610c and towards cell 610b. When control circuitry 304 receives an instruction (e.g., a right arrow key press on the user input device) to move the cursor or highlight region towards the right, the cursor may be moved towards the next adjacent cell on the right. In some implementations, the cells may be arranged in a vertical orientation, and accordingly the user may similarly press the up/down directional arrow keys to navigate the cursor to a desired cell representing a particular time period.

In some embodiments, when a given one of cells 610 is highlighted for a predetermined period of time (e.g., 2 seconds), the given cell may be expanded to display second plurality of cells 630. In some implementations, instead of or in addition to expanding the given cell after the predetermined period of time, the user may press a suitable key on the user input device (e.g., a SELECT button) to instruct control circuitry 304 to expand the cell over which the cursor is positioned. Second plurality of cells 630 displayed within cell 610 may represent time periods within the day represented by cell 610. For example, cell 610c may represent the time period Tuesday and the cells 630 within cell 610c may represent time periods within the day Tuesday (e.g., time period 9 AM-12 PM).

The length of the time interval of the time period represented by each cell 630 may be identical to or correspond to the length of the time interval displayed in grid 102 (FIG. 1) (e.g., 3 hours). For example, each cell 630 may represent a 3 hour time period. As discussed above, cells that represent time periods previous to the current time period may be grayed out or shaded a different color or be visually distinguished from other cells in hopscotch display 600.

Each of second plurality of cells 630 may represent consecutive time periods (e.g., hours within a given day of the week). For example, cell 630a may represent the hours 2-5 AM, cell 630b may represent the hours 5-8 AM and cell 640 may represent the hours 9 AM-12 PM. To represent consecutive time periods there may be no break in the time period that is represented by cells 630. In particular, if a 6 hour time interval (length of time) is to be presented in cell 610 of hopscotch display 600 and each cell represents one hour within a given day of the week, hopscotch display 600 will include 6 different cells 630. In some implementations, the cells may be arranged in consecutive order such that the cell representing the time period 9 AM-12 PM is adjacent to both the cells representing the time period 6 AM-9 AM and 12 PM-3 PM.

In some embodiments, when hopscotch display 600 is initially provided, the cell representing the current time period is automatically highlighted or selected by a cursor. For example, cell 640 representing the current time period may be shaded a different color, may have a different size than the other cells in hopscotch display 600 or may be distinguished from the other cells in hopscotch display 600 in any other suitable manner. In particular, the current time in display 600 may 9:02 AM on Tuesday, and accordingly cell 640 within cell 610c representing the time period 9 AM-12 PM on Tuesday is initially highlighted by the cursor (illustrated as being sized differently from the other cells in hopscotch display 600). The navigation between different cells 630 is performed in a similar manner as discussed above with respect to cells 610 and hopscotch display 540 (FIG. 5).

In some embodiments, as the user navigates the cursor over cells 610 representing different days of a week, control circuitry 304 may retrieve from memory actions or events scheduled for that day. For example, when the user navigates the cursor over cell 610b representing Monday, May 22nd, control circuitry 304 may retrieve from memory actions or events previously scheduled for that day (Monday, May 22nd). In particular, any program scheduled for recording on the day represented by the cell highlighted by the cursor or reminder set for a program broadcast or provided on the day represented by the cell highlighted by the cursor may be retrieved from memory. The list of actions or events retrieved from the memory may be displayed in events window 620.

For example, events window 620 may display information identifying recordings scheduled for the day represented by the cell highlighted by the cursor. The information may include the program title, a short description, broadcast time and channel, an indicator that indicates to the user whether the program is an episode of a series scheduled for recording and any other suitable information. In some implementations, the user may navigate the cursor to events window 620 to select a particular event listed in events window 620. In particular, the user may select a particular event listed to make modifications (e.g., change a recording time or reminder time) or cancel the action or event altogether. In some implementations, part of the events listed in events window 620 may not be modified and may be blocked based on parental control settings. The parental control settings prevents another user with different or insufficient access rights from canceling or modifying a particular action or event.

In some embodiments, as the user navigates the cursor over different actions or events listed in events window 620, a short preview clip or promotional segment may be displayed in video window 650. For example, when the user navigates the cursor over the scheduled recording for King of the Hill, video window 650 may display a promotional or preview clip for the upcoming or related show or a preview of the scheduled recording. When video window 650 displays a preview or promotional clip of an upcoming or related show, the user may navigate the cursor to video window 650 or press a suitable button on the user input device to cause an action or event (e.g., a recording or reminder) to be scheduled for the corresponding program. As the user navigates to other actions or events (e.g., The Dark Knight), video window 650 may change to display a promotional or preview clip of the program corresponding to the action or event over which the cursor is positioned (e.g., The Dark Knight).

FIG. 7 shows an illustrative hopscotch display 700 in accordance with an embodiment of the invention. Hopscotch display 700 is similar to hopscotch display 600 (FIG. 6) discussed above. In particular, hopscotch display 700 includes a first plurality of cells 710, a second plurality of cells 720, video window 650 and events window 750.

First plurality of cells 710 may have the same or similar functionality as cells 610 (FIG. 6). In particular, each of first plurality of cells 710 may represent consecutive time periods (e.g., days of the week). For example, first cell 710 may represent Sunday, second cell 710 may represent Monday and third cell 710 may represent Tuesday. Any number of cells 710 may be provided where each represents a day of the current week or subsequent or prior weeks. To represent consecutive time periods there may be no break in the time period that is represented. In particular, if a 6 day interval (length of time) is to be presented in hopscotch display 700 and each cell represents a single day of the week, hopscotch display 700 will include 7 different cells. In some implementations, the cells may be arranged in consecutive order such that the cell representing the time period Monday is adjacent to both the cells representing the time period Sunday and Tuesday. Alternatively, cells 710 and/or cells 610 may be arranged in any suitable order (e.g., randomly, pseudo-randomly, or user selected/specified order).

In some embodiments, when hopscotch display 700 is initially provided, the cell representing the current time period is automatically highlighted or selected by a cursor. For example, cell 710 representing the current time period may be shaded a different color, may have a different size than the other cells in hopscotch display 700 or may be distinguished from the other cells in hopscotch display 700 in any other suitable manner. In particular, the current time in display 700 may be 9:02 AM on Sunday, and accordingly cell 710 representing the time period Sunday is initially highlighted by the cursor (illustrated as being in BOLD differently from the other cells in hopscotch display 700). To navigate and select a cell representing another time period, the user may press a directional arrow key on the user input device that corresponds to the direction to which the cursor is to be moved. For example, when the cursor is positioned over cell 710, the user may press a left directional arrow key on the user input device to move the cursor towards the cells on the left of cell 710 and towards cell 710. When control circuitry 304 receives an instruction (e.g., a right arrow key press on the user input device) to move the cursor or highlight region towards the right, the cursor may be moved towards the next adjacent cell on the right. In some implementations, the cells may be arranged in a vertical orientation, and accordingly the user may similarly press the up/down directional arrow keys to navigate the cursor to a desired cell representing a particular time period.

Second plurality of cells 720 may have the same or similar functionality as cells 630 (FIG. 6). In particular, each of second plurality of cells 720 may represent consecutive time periods (e.g., hours within a given day of the week). For example, a first cell 720 may represent the hours 1-3:59 AM, a second cell 720 may represent the hours 4-6:59 AM and a third cell 720 may represent the hours 7 AM-9:59 AM. To represent consecutive time periods there may be no break in the time period that is represented by cells 720. In particular, if a 6 hour time interval (length of time) is to be presented by cells 720 of hopscotch display 700 and each cell 720 represents one hour within a given day of the week, hopscotch display 700 will include 6 different cells 720. In some implementations, cells 720 may be arranged in consecutive order such that cell 720 representing the time period 7 AM-9:59 AM is adjacent to both the cells representing the time period 4 AM-6:59 AM and 10 AM-12:59 PM.

In some embodiments, when hopscotch display 700 is initially provided, the cell representing the current time period is automatically highlighted or selected by a cursor. For example, cell 722 representing the current time period may be shaded a different color, may have a different size than the other cells in hopscotch display 700 or may be distinguished from the other cells in hopscotch display 700 in any other suitable manner. In particular, the current time in display 700 may be 10:02 AM on Sunday, and accordingly cell 722 underneath cell 730 representing the time period 10 AM-12:59 PM on Sunday is initially highlighted by the cursor. In some embodiments, when hopscotch display 700 is initially provided, the cell representing the time period of the previously displayed grid 102 is automatically highlighted or selected by a cursor. In particular, the user may have been browsing listings for a week later than the current time and accordingly, the cell representing the time period of that later week is automatically highlighted or selected by a cursor.

In some embodiments, only eight cells 710 corresponding to 7 days of one week and 1 day of a subsequent/previous week are provided. However, any number of additional or fewer cells 710 may be provided. In order to display cells 710 for an adjacent day that is not displayed that is a day of a subsequent or previous week, the user may select options 760 or press a directional arrow on a user input device. For example, the user may navigate the cursor to the last day shown in display 700 (e.g., Saturday) and selection option 760 (right arrow) or press a right directional arrow on user input device. When control circuitry 304 receives the input from the user (right arrow), control circuitry 304 may shift the cells 710 in the display one day over and display the next adjacent day (e.g., Sunday) in cell 710. In some implementations, when control circuitry 304 receives the input from the user (right arrow), control circuitry 304 may shift the cells 710 in the display one full week and day (e.g., 8 days) over and display the next/previous adjacent 8 days in cells 710.

The navigation between different cells 720 is performed in a similar manner as discussed above. In particular, since cells 720 are illustrated as being in the vertical alignment, selection of a particular cell 720 may be performed by using the up/down navigational arrows keys or options using the user input device. Similarly, since cells 710 representing the days of the week are illustrated as being in the horizontal alignment, selection of a particular cell 710 may be performed by using the left/right navigational arrow keys or options using the user input device.

In some embodiments, the cursor may be positioned over a particular one of cells 720 representing a first time period (e.g., the hours 10 AM-12:59 PM of the day Sunday) using the up/down navigational arrow keys. Upon receiving a user input, such as, a left/right navigational arrow key, control circuitry 304 may move the cursor to be positioned over the same hourly time period (e.g., 10 AM-12:59 PM) over an adjacent day (e.g., Saturday for a left navigation instruction or Monday for a right navigation instruction). This is shown in display 800 of FIG. 8, where display 700 shows the cursor being positioned over a cell 722 representing a first time period on Sunday and after receiving a user instruction to move the cursor to the right (e.g., by pressing the right navigational arrow key on the user input device), the cursor is positioned over the same time period on the adjacent day, Monday. More specifically, control circuitry 304 may move the cursor to select an adjacent cell representing a time period corresponding to a day of the week each time control circuitry 304 receives one of a first pair of directional arrow instructions (e.g., left/right arrows). Similarly, control circuitry 304 may move the cursor to select an adjacent cell representing a time period corresponding to an hour within a particular day of the week each time control circuitry 304 receives one of a second pair of directional arrow instructions (e.g., up/down arrows).

The length of the time interval of the time period represented by each cell 720 may be identical to or correspond to the length of the time interval displayed in grid 102 (FIG. 1) (e.g., 3 hours). For example, each cell 720 may represent a 3 hour time period.

FIG. 7 shows the days of the week as being represented by cells 710 arranged along the horizontal direction and the hours within a day are shown as being represented by cells 720 arranged underneath the corresponding day along the vertical direction. However, it should be understood that in some implementations, the days of the week may be represented by cells arranged along the vertical direction and the hours within a day may be represented by cells arranged next to the corresponding day along the horizontal direction. In some implementations, cells 710 and 720 representing time periods that are previous to the current time may be visually distinguished from the other cells in the display (e.g., by using a different color or shade).

Events window 750 may display information in the form of indicators 752 and 754 identifying actions or events (e.g., recordings or reminders) scheduled for the day represented by cell 710 highlighted by the cursor. Indicators 752 and 754 may include the program title, a short description, broadcast time and channel, an indicator that indicates to the user whether the program is an episode of a series scheduled for recording and any other suitable information. Indicators 752 and 754 may include a visual identifier 756 (e.g., an image, picture or video) representing the asset for which the action or event is scheduled. For example, identifier 756 may be a preview clip, album cover image, theme image associated with the asset.

In some implementations, the user may navigate the cursor to events window 750 to select a particular event indicator 752 or 754 shown in events window 750. In particular, the user may select a particular event listed to make modifications (e.g., change a recording time or reminder time) or cancel the action or event altogether. In some implementations, part of the events listed in events window 750 may not be modified and may be blocked based on parental control settings. The parental control settings prevents another user with different or insufficient access rights from canceling or modifying a particular action or event. Different event indicators may be selected by navigating the cursor using the directional arrow keys (e.g., left/right keys) and pressing a SELECT key on the user input device.

To navigate the cursor from cells 710 representing time periods, the user may press a directional arrow key (e.g., an up arrow key). Control circuitry 304 may navigate the cursor to the first event indicator 752 shown in window 750 when the user presses the up arrow key on the user input device while the cursor is on one of cells 710. A return option 740 may be provided in display 700. Selection of return option 740 may instruct control circuitry 304 to display the previous screen from which the user was navigated prior to the hopscotch display. For example, control circuitry 304 may navigate the user back to grid 102 where the user left off or may tune the user back to the previously watched channel or show.

Figure 9:
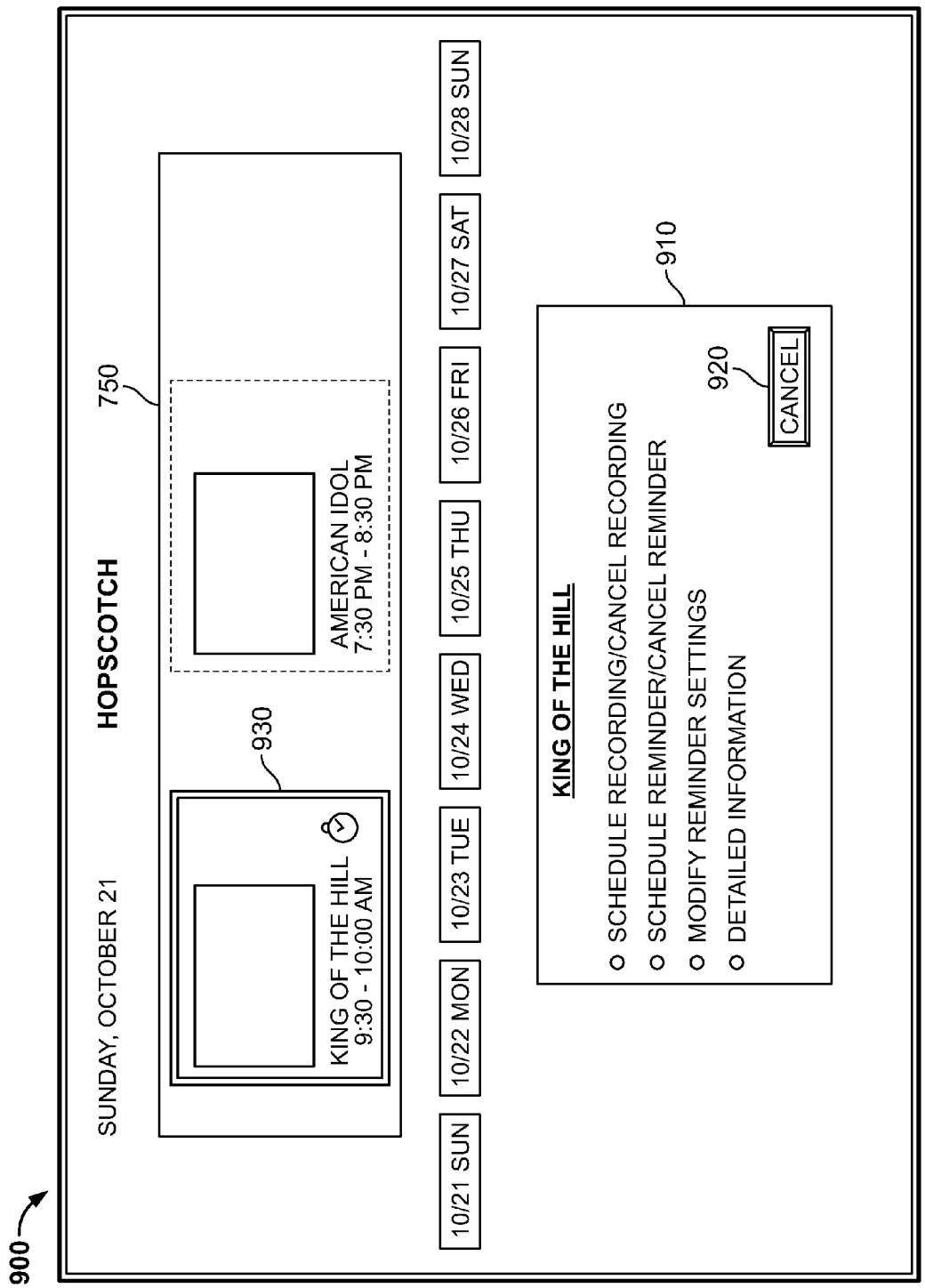
FIG. 9 shows an illustrative display of event modification prompt in accordance with an embodiment of the invention.

FIG. 9 shows an illustrative display 900 of event modification in accordance with an embodiment of the invention. In particular, display 900 shows the cursor 930 positioned over one of the event indicators shown in event window 750. When the user selects a particular event indicator, control circuitry 304 may display an event prompt window 910. Event prompt window 910 may include options that allow the user to modify the event or action scheduled for the asset corresponding to the selected event indicator. In particular, event window 910 may include options allowing the user to cancel a recording scheduled for the asset, schedule a recording for the asset (when one was not previously scheduled), cancel a reminder scheduled for the asset, schedule a reminder for the asset (when one was not previously scheduled), modify reminder settings (e.g., changing how long before the start of the asset to provide the reminder), and request detailed information about the asset.

In some implementations, the user may press a dedicated key on the user input device (e.g., an INFO key) while the cursor is positioned over an event indicator. When control circuitry 304 receives the user input of the INFO key while the cursor is positioned over the event indicator, control circuitry 304 may retrieve from memory detailed information about the asset for which the action or event is scheduled. The detailed information may be displayed in place of window 910.

Selection of the cancel option 920 may instruct control circuitry 304 to disregard any selections made in window 910 and return the user to event window 750 for selection of an event indicator.

Figure 10:
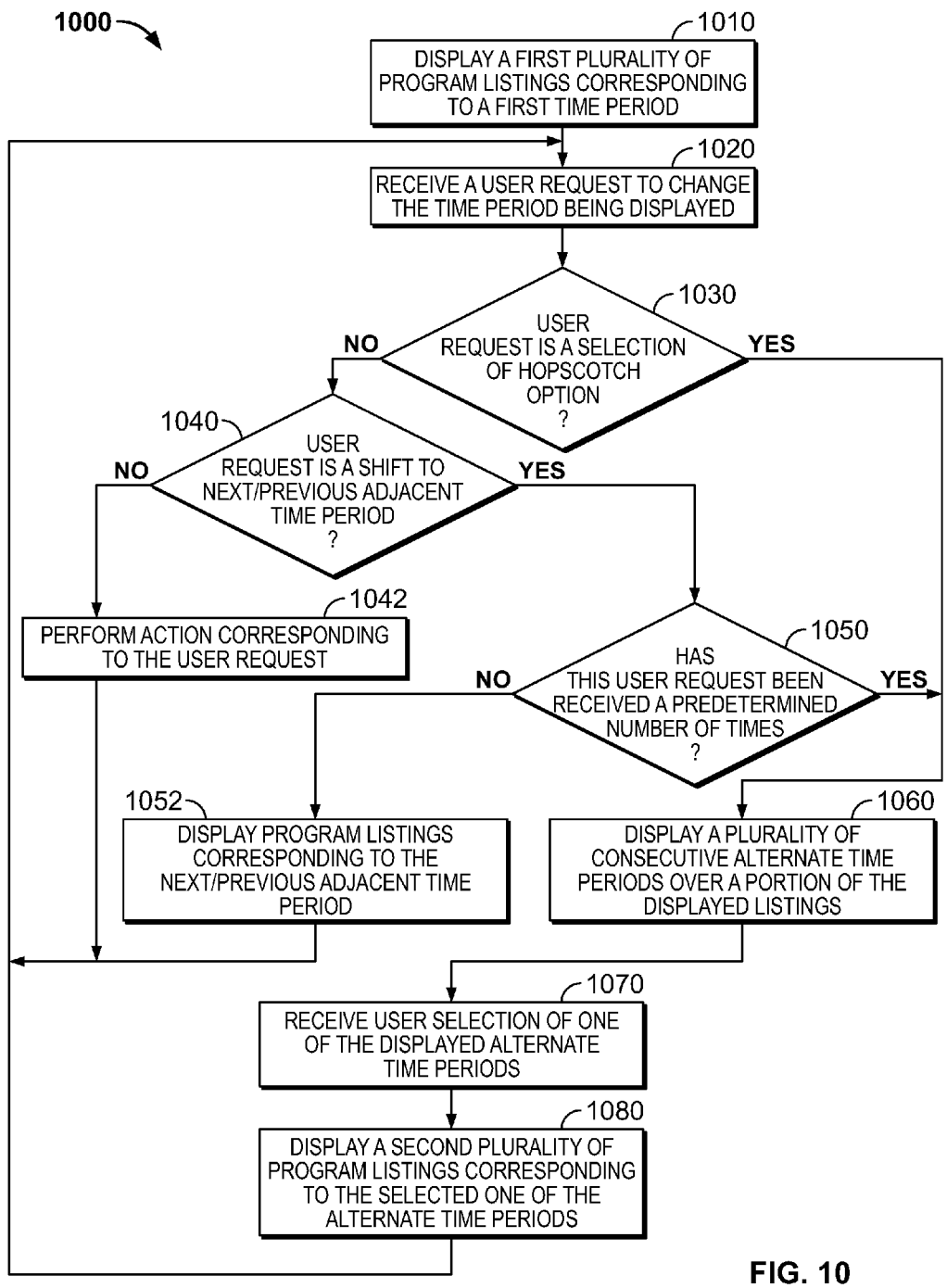
FIG. 10 illustrates a flow diagram for navigating a media guidance application in accordance with an embodiment of the invention.

FIG. 10 illustrates a flow diagram 1000 for navigating a media guidance application in accordance with an embodiment of the invention. At step 1010, a first plurality of program listings corresponding to a first time period are displayed. For example, control circuitry 304 may display on grid 102 a first plurality of program listings 104 (FIG. 1a). Similarly, control circuitry 304 may display a first program listing 524 simultaneously with (or overlaid on top of) video 510 (FIG. 5).

At step 1020, a user request to change the time period being displayed is received. For example, control circuitry 304 may receive a user selection of hopscotch option 140 or 530 (FIG. 1 or 5). In some implementations, control circuitry 304 may receive a user input instructing control circuitry 304 to display program listings for a time period adjacent to the displayed time period through a selection of option 120 and/or a dedicated button on a remote control (e.g., directional arrow key).

At step 1030, a determination is made as to whether the user request is a selection of a hopscotch option. When the user request is a selection of a hopscotch option, the process proceeds to step 1060, otherwise the process proceeds to step 1040.

At step 1040, a determination is made as to whether the user request is a shift to next/previous adjacent time period.

When the user request is a shift to next/previous adjacent time period, the process proceeds to step 1050, otherwise the process proceeds to step 1042.

At step 1042, an action corresponding to the user request is performed. For example, when the user request is a select command, control circuitry 304 may access the program (e.g., by tuning to the channel) corresponding to a highlighted program listing.

At step 1050, a determination is made as to whether the instruction corresponding to the user request has been received a predetermined number of times. When the user request has been received a predetermined number of times, the process proceeds to step 1052, otherwise the process proceeds to step 1060. For example, control circuitry 304 may count the number of times the user instructed control circuitry 304 to display program listings for an adjacent time period. When the same or identical instruction (e.g., to display program listings for an adjacent time period) is received a predetermined number of times (e.g., 3 times), control circuitry 304 may proceed to step 1052.

At step 1052, program listings corresponding to the next/previous adjacent time period are displayed. For example, control circuitry 304 may display program listings for the time period of 10 PM-12 AM (FIG. 1*b*) which is adjacent to the previously displayed time period of 7 PM-9 PM (FIG. 1*a*).

At step 1060, a plurality of consecutive alternate time periods are displayed in place of a portion of the displayed program listings. For example, control circuitry 304 may slide into the display hopscotch display 540, 600 or 700 (FIG. 5, 6 or 7).

At step 1070, a user selection of one of the displayed alternate time periods is received.

At step 1080, a second plurality of program listings corresponding to the selected one of the alternate time periods are displayed.

It should be understood that the above steps of the flow diagram of FIG. 10 may be executed or performed in any order or sequence not limited to the order and sequence shown and described in the figure. Also, some of the above steps of the flow diagram of FIG. 10 may be executed or performed substantially simultaneously where appropriate or in parallel to reduce latency and processing times.

The above described embodiments of the present disclosure are presented for purposes of illustration and not of limitation, and the present disclosure is limited only by the claims which follow.

What is claimed is:

1. A method for navigating about an interactive media guidance application, the method comprising:
 generating a simultaneous display of a video program and a first program listing corresponding to a first time period;
 receiving a user request to display a second program listing corresponding to a second time period;
 in response to receiving the user request, generating a simultaneous display of the video program, the first program listing and a plurality of alternate time periods associated with no program listing being displayed, wherein:
  the displayed plurality of alternate time periods comprises a plurality of cells each representing a different time period within a particular day of the week; and
  each of the different time periods represented by each of the plurality of cells corresponds to a time interval equal to a time interval of the first time period;
 receiving a user selection of one of the displayed alternate time periods; and
 generating a simultaneous display of the second program listing, corresponding to the selected one of the alternate time periods, the plurality of alternate time periods and the video program.

2. The method of claim 1 wherein receiving the user request comprises receiving a user selection of an icon displayed with the first program listing.

3. The method of claim 1 wherein receiving the user request comprises receiving a plurality of identical user instructions a predetermined number of times.

4. The method of claim 3, wherein each of the plurality of identical user instructions causes the media guidance application to shift a time period for which program listings are displayed to another adjacent time period.

5. The method of claim 3, wherein a first of the plurality of identical user instructions causes the media guidance application to display a third program listing corresponding to a third time period adjacent to the first time period.

6. The method of claim 1, wherein the alternate time periods are consecutive in time.

7. The method of claim 1, wherein the first program listing is overlaid over the video of the program.

8. A system for navigating about an interactive media guidance application, the system comprising:
 processing circuitry configured to:
  generate a simultaneous display of a video program and a first program listing corresponding to a first time period;
  receive a user request to display a second program listing corresponding to a second time period;
  in response to receiving the user request, generate a simultaneous display of the video program, the first program listing and a plurality of alternate time periods associated with no program listing being displayed, wherein:
   the displayed plurality of alternate time periods comprises a plurality of cells each representing a different time period within a particular day of the week; and
   each of the different time periods represented by each of the plurality of cells corresponds to a time interval equal to a time interval of the first time period;
  receive a user selection of one of the displayed alternate time periods; and
  generate a simultaneous display of the second program listing, corresponding to the selected one of the alternate time periods, the plurality of alternate time periods and the video program.

9. The system of claim 8 wherein the processing circuitry is further configured to receive as the user request a user selection of an icon displayed with the first program listing.

10. The system of claim 8 wherein the processing circuitry is further configured to receive as the user request a plurality of identical user instructions a predetermined number of times.

11. The system of claim 10, wherein each of the plurality of identical user instructions causes the media guidance application to shift a time period for which program listings are displayed to another adjacent time period.

12. The system of claim 10, wherein a first of the plurality of identical user instructions causes the media guidance application to display a third program listing corresponding to a third time period adjacent to the first time period.

13. The system of claim 8, wherein the alternate time periods are consecutive in time.

14. The system of claim 8, wherein the first program listing is overlaid over the video of the program.

15. The method of claim 1, wherein displaying the plurality of alternate time periods comprises excluding the second program listing from the display.

16. The system of claim 8 wherein the processing circuitry is further configured to exclude the second program listing from the display of the plurality of alternate time periods.

17. The method of claim 1 wherein the plurality of alternate time periods is displayed in an overlay on top of the video program.

18. The system of claim 8 wherein the plurality of alternate time periods is displayed in an overlay on top of the video program.

* * * * *